United States Patent
Du et al.

(10) Patent No.: US 8,987,936 B2
(45) Date of Patent: Mar. 24, 2015

(54) METHOD AND APPARATUS FOR PEAK SHIFTING ADJUSTMENT

(75) Inventors: Yumin Du, Chengdu (CN); Hongdong Zhang, Chengdu (CN)

(73) Assignee: Huawei Digital Technologies (Cheng Du) Co. Limited, Chengdu (CN)

( * ) Notice: Subject to any disclaimer, the term of this patent is extended or adjusted under 35 U.S.C. 154(b) by 756 days.

(21) Appl. No.: 13/272,370

(22) Filed: Oct. 13, 2011

(65) Prior Publication Data

US 2012/0032508 A1 Feb. 9, 2012

Related U.S. Application Data

(63) Continuation of application No. PCT/CN2010/071814, filed on Apr. 16, 2010.

(30) Foreign Application Priority Data

Apr. 30, 2009 (CN) .......................... 2009 1 0138534

(51) Int. Cl.
```
H02J 1/00      (2006.01)
H02J 3/14      (2006.01)
H02P 27/08     (2006.01)
H02P 1/56      (2006.01)
H02P 5/74      (2006.01)
```
(52) U.S. Cl.
CPC ........ *H02P 27/08* (2013.01); *H02P 1/56* (2013.01); *H02P 5/74* (2013.01)
USPC ......................................................... 307/31

(58) Field of Classification Search
USPC ............................... 307/31, 32, 38, 39, 40, 41
See application file for complete search history.

(56) References Cited

U.S. PATENT DOCUMENTS

| | | |
|---|---|---|
| 6,396,225 B1 | 5/2002 | Wakui et al. |
| 2002/0125863 A1* | 9/2002 | Lin et al. ........................ 323/234 |
| 2003/0063108 A1 | 4/2003 | Isono et al. |
| 2003/0160586 A1 | 8/2003 | Donnelly et al. |
| 2008/0259655 A1 | 10/2008 | Wei et al. |

FOREIGN PATENT DOCUMENTS

| | | |
|---|---|---|
| CN | 1271992 A | 11/2000 |
| CN | 1410963 A | 4/2003 |
| CN | 1456027 A | 11/2003 |

(Continued)

OTHER PUBLICATIONS

International Search Report, PCT/CN2010/071814, Jul. 15, 2010, 6 pages.

(Continued)

*Primary Examiner* — Carlos Amaya
(74) *Attorney, Agent, or Firm* — Slater & Matsil, L.L.P.

(57) ABSTRACT

An apparatus and a method for peak shifting adjustment are disclosed. The apparatus includes a controlling unit that is configured to sequentially control different outputting units to output the Pulse-Width Modulation (PWM) signals according to a preset time sequence. The interval between two adjacent outputted PWM signals is T1, which is the time when the current required by an electric device is higher than the normal current in case of an increase of the duty cycle of the PWM signals. At least two outputting units are connected to corresponding electric devices and configured to output the PWM signals to the corresponding electric devices according to the control of the controlling unit.

10 Claims, 4 Drawing Sheets

(56) References Cited

FOREIGN PATENT DOCUMENTS

| CN | 1655963 A | 8/2005 |
|---|---|---|
| CN | 101527554 A | 9/2009 |
| JP | 2000316294 A | 11/2000 |

OTHER PUBLICATIONS

Written Opinion of the International Searching Authority, PCT/CN2010/071814, Jul. 15, 2010, 5 pages.

First Chinese Office Action, Chinese Application No. 200910138534.X, Apr. 14, 2010, 9 pages.

* cited by examiner though the extent of reduction achieved
METHOD AND APPARATUS FOR PEAK SHIFTING ADJUSTMENT This application is a continuation of International Application No. PCT/CN2010/071814, filed on Apr. 16, 2010, which claims priority to Chinese Patent Application No. 200910138534.X filed on Apr. 30, 2009, both of which are hereby incorporated by reference in their entireties.

TECHNICAL FIELD

The present invention relates to the field of pulse control, and in particular, to a method and an apparatus for peak shifting adjustment.

BACKGROUND

Pulse-Width Modulation (PWM) normally produces a waveform with a fixed frequency and a variable duty cycle, and is widely used to control an electromechanical device. In most applications, a PWM signal is used in a control circuit to control the speed of a fan. That is, the speed of a fan is controlled by regulating the duty cycle of the PWM signal of a control instruction.

In a more complex system, most heat is dissipated by multiple fans, which according to the system difference, results in multiple PWM control instructions generated for multiple fans, and two or more fans controlled by one PWM signal in the system. Because multiple fans in the system are powered by the same power supply, when the speed of one fan changes, the fan requires a large instantaneous current, and the change of the speed of multiple fans has a great adverse impact on the power supply.

FIG. 1 shows requirements of a fan for a current when the duty cycle corresponding to the speed is regulated from 0 to 100%. It may be seen that the maximum current may reach 6.5 A after the start of the fan (possibly lasting more PWM signal periods), and that the current is only 2.6 A during the normal working after a period of time.

When there are multiple fans in the system and the fans are started simultaneously, the adverse impact on the power supply is obvious. FIG. 2 shows PWM speed regulation and requirements of two fans for a current when the duty cycle corresponding to the speed is regulated from 0 to 50% (when the duty cycle corresponding to the speed of the fans is regulated from 0 to 50%, the instantaneous current is not so large, and the data here is temporarily used for easy explanation). When the two fans are started at the same time, the maximum required current provided by a power supply module is 13 A, while during the normal working, the current is 5.2 A.

The prior art provides two solutions:
1. Increase the maximum output current capacity of a power converting module.
2. Reduce the starting current of the fans by fan manufacturers.

The first solution has the problem that a power converting module with large rated output power is required by a power supply module to meet the requirement for a short-term large current, while such large power is not necessary during the normal working of the fans, which results in design waste. The power supply with large output power is not only large in size, but also expensive, leading to a great increase in cost and is incompliance with the design idea.

The second solution requires manufacturers to reduce the starting current of the fans, which is based on the quality control of the fans; however, the extent of reduction achieved by different manufacturers is different, and some manufacturers may reduce the starting current, but the starting current is still larger than the normal working current. Moreover, the fans designed by different manufacturers are different in the starting current, which is not suitable for using the fans of the same specifications from different manufacturers in a system, directly leading to few choices of heat dissipation systems during the system design.

SUMMARY OF THE INVENTION

An embodiment of the present invention provides an apparatus for peak shifting adjustment, including: a controlling unit, configured, after receiving PWM signals, to sequentially control different outputting units to output the PWM signals according to a preset time sequence, where the interval between two adjacent outputted PWM signals is T1 which is the time when a current required by an electric device is higher than a normal current in case of an increase of the duty cycle of the PWM signals; and at least two outputting units each connected to an electric device, configured to output the PWM signals to the corresponding electric devices according to the control of the controlling unit.

An embodiment of the present invention provides a method for peak shifting adjustment, including: after receiving PWM signals, sequentially outputting control instructions according to a preset time sequence, where the interval between two adjacent outputted control instructions is T1 which is the time when a current required by an electric device is higher than a normal current in case of an increase of the duty cycle of the PWM signals; and outputting the PWM signals to one or more electric devices according to each sequentially outputted control instruction.

By peak shifting adjustment of fans, embodiments of the present invention reduce the requirements of an electric device for the power supply when the duty cycle of the PWM signals increases, and therefore lower the hardware cost in system design.

BRIEF DESCRIPTION OF THE DRAWINGS

To explain the technical solutions of the embodiments of the present invention or the prior art more clearly, the following briefly describes the drawings required in the description of the embodiments or the prior art. Obviously, the drawings are exemplary only, and those skilled in the art may obtain other drawings according to the drawings without creative efforts.

DETAILED DESCRIPTION OF ILLUSTRATIVE EMBODIMENTS

Embodiments of the present invention are hereinafter described in detail with reference to the accompanying drawings of embodiments. Obviously, the embodiments described are exemplary only and not exhaustive. Other embodiments derived by those skilled in the art on the basis of the embodiments herein without creative efforts fall within the protection scope of the present invention.

Figure 1:
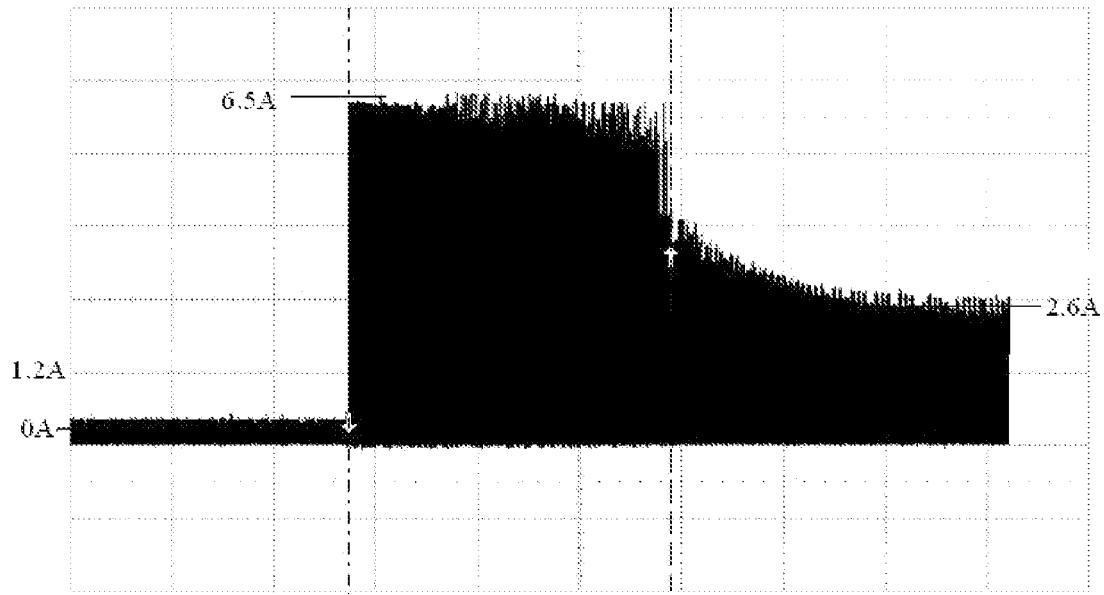
FIG. 1 shows an actual measurement result of an instantaneous current when a fan is started.
Figure 2:
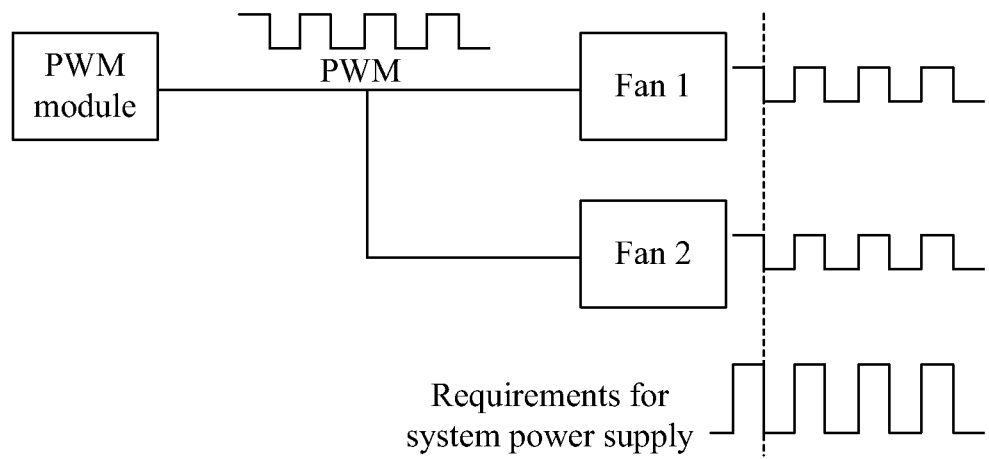
FIG. 2 is a schematic diagram illustrating requirements of fans for a current according to PWM control.
Figure 3:
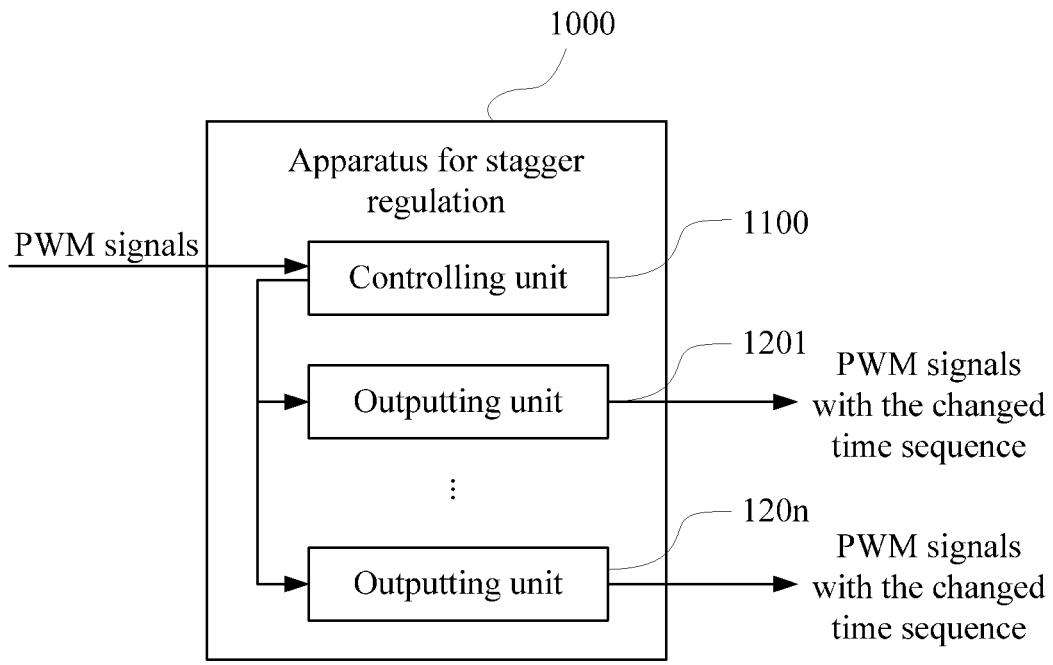
FIG. 3 is a structure diagram of an apparatus for peak shifting adjustment according to an embodiment of the present invention.

As shown in FIG. 3, an embodiment of the present invention provides an apparatus 1000 for peak shifting adjustment. The apparatus includes a controlling unit 1100 and at least two outputting units 1201-120n each connected to an electric device. The controlling unit 1100 is configured, after receiving PWM signals, to sequentially control different outputting units to output the PWM signals according to a preset time sequence, where the interval between two adjacent outputted PWM signals is T1 which is the time when the current required by an electric device is higher than the normal current in case of an increase of the duty cycle of the PWM signals (T1 may be set to the time when the current required by the electric device is higher than the normal current in case of an increase of the duty cycle of the PWM signals from 0% to 100%, for example, 0.5 s as shown in FIG. 1), where the current required by the electric device may be understood as the instantaneous high current required when the electric device is triggered, and the normal current may be understood as the working current when the electric device is stable in working. In this way, the time when an instantaneous high current is required by the electric device is staggered, and every time the PWM signals are outputted to a new electric device, the previous electric device receiving the PWM signals is working normally. The at least two outputting units 1201-120n are configured to output the PWM signals to the corresponding electric devices according to the control of the controlling unit.

The apparatus in the embodiment of the present invention reduces the maximum current required by an electric device during the start or speed regulation of the electric device through the peak shifting adjustment of PWM control signals, without changing the existing characteristics of the electric device.

The preset time sequence of the controlling unit 1100 may be as follows: every time a different outputting unit is controlled to output the PWM signals, that is, after receiving the PWM signals, the controlling unit controls a first outputting unit 1201 to output the PWM signals, after an interval of T1, controls a second outputting unit to output the PWM signals, and, after another interval of T1, controls a third outputting unit to output the PWM signals, until an $n^{th}$ outputting unit 120n is controlled according to such a sequence, so that the interval for outputting the PWM signals from each outputting unit is T1. That is, the electric device is started by sequentially outputting the PWM signals, and the next electric device is started after the previously started electric device is stable in a current demand after an interval of T1. In this way, only one electric device requires a current higher than the normal current at one time, which therefore relieves the pressure of the power supply. The outputting units 1201 to 120n may be marked with different numbers, for example, 0 to n-1, and the controlling unit 1100 may obtain the delay time required for each outputting unit by multiplying the number of the outputting unit by T1. For example, the delay time calculated by the controlling unit 1100 for the first outputting unit 1201 with the number of 0 is 0, and the controlling unit 1100 immediately sends a control instruction to control the first outputting unit 1201 to output the received PWM signals. The control instruction may carry the number "0" of the outputting unit 1201, and the outputting unit 1201 may select the instruction for execution according to the number "0".

Optionally, the preset time sequence of the controlling unit 1100 may be as follows: every time two outputting units are controlled to output the PWM signals, so that only two electric devices require a current higher than the normal current at one time, which therefore relieves the pressure of the power supply. The rest may be inferred by analogy.

Furthermore, in the embodiment of the present invention, the outputting units 1201-120n further include: a waveform shifting function, configured to shift the waveform of the PWM signals by ½ period according to the control of the controlling unit. The controlling unit 1100 may carry a waveform shifting instruction in a sent control instruction to control the corresponding outputting units to implement the waveform shifting function. The preset time sequence of the controlling unit 1100 may be as follows: every time two different outputting units are controlled to output the PWM signals, and one of the two outputting units uses the waveform shifting function. Every time the controlling unit 1100 sends a control instruction, the controlling unit 1100 calculates the time for sending the control instruction to each outputting unit and determines whether the control instruction carries a waveform shifting instruction according to the sequence of the outputting units, for example, the sequence 0 to n−1 of the outputting units 1201 to 120n. The algorithm may be as follows: dividing the number of each outputting unit by 2, taking the integral part Z of the obtained result, multiplying Z by T1 to obtain the time for sending the control instruction to each outputting unit, and carrying the waveform shifting instruction in the corresponding control instruction according to the parity of the number. For example, the integers obtained by dividing 0 and 1 by 2 are both Z which is 0, and 0 multiplied by T1 is 0, so the time for sending a control instruction to the outputting units 0 and outputting units 1 is 0, that is, the control instruction is sent immediately, where 1 is odd, and the control instruction sent to the outputting unit 1 carries a waveform shifting instruction. Likewise, the time for sending a control instruction to the outputting units 1201 and 120n is T1, and the control instruction sent to the outputting unit 3 carries a waveform shifting instruction. With this embodiment, two electric devices may be started simultaneously.

Figure 4A:
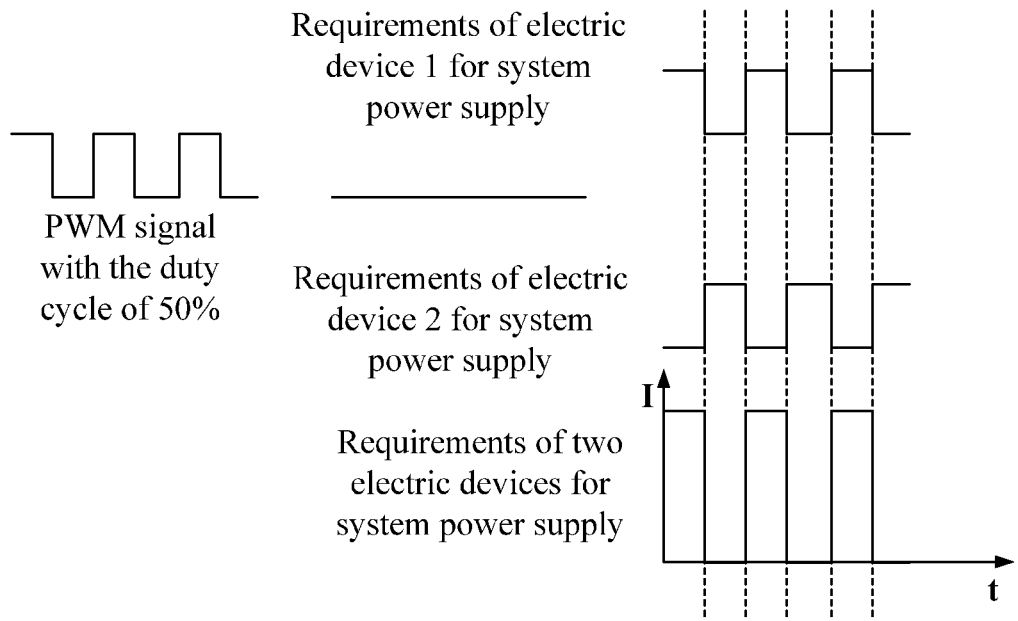
FIG. 4A is a schematic diagram illustrating requirements of an electric device for the system power supply when the method for peak shifting adjustment is not used.
Figure 4B:
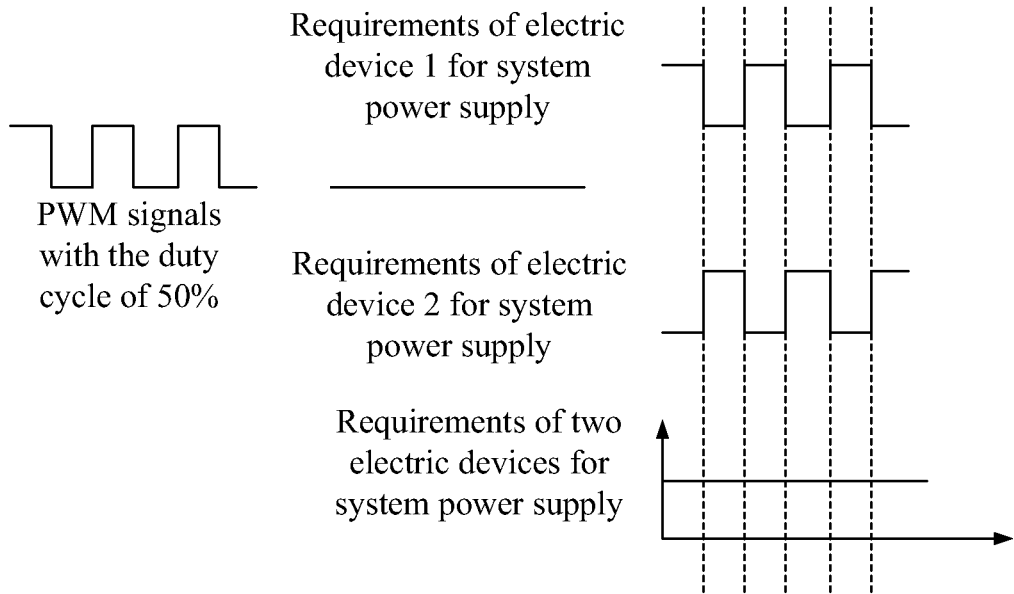
FIG. 4B is a schematic diagram illustrating requirements of an electric device for the system power supply when the method for peak shifting adjustment is used.

FIG. 4A is a schematic diagram illustrating requirements of electric devices 1 and 2 for the system power supply when the method for peak shifting adjustment is not used, where the horizontal axis is time t, and the vertical axis is current I. It may be seen that, when the duty cycle of the PWM signals is 50%, the requirements of two fans not regulated by peak shifting adjustment for the power supply current are twice that of one fan in half of each period. FIG. 4B is a schematic diagram illustrating requirements of electric devices 1 and 2 for the system power supply when the method for peak shifting adjustment is used. It may be seen that the requirements of two electric devices regulated by peak shifting adjustment for the power supply current are the same as that of a single electric device. Taking a fan as an example, when the duty cycle corresponding to the speed of the fan is regulated from 0 to 50%, as shown in FIG. 1, the starting current of the fan is large, reaching 6.5 A, while the current is only 2.6 A during the normal working (the data here is temporarily used for easy explanation).

Because the two fans not regulated by peak shifting adjustment in FIG. 4A are simultaneously started, the required maximum current of the power supply may reach:

Maximum current required by a single fan×2=6.5×
2=13 A

The current required by two fans regulated by peak shifting adjustment in FIG. 4B may be calculated as follows:

Starting current of a single fan×1=6.5 A

It may be seen that the maximum instantaneous current of the fan power supply is the maximum current of a single fan regulated by peak shifting adjustment, which is obviously improved in comparison with the current required by a fan not regulated by peak shifting adjustment.

If the working voltage of a fan is 12 V, the maximum instantaneous power to be provided by a system without regulating the fan is:

Output voltage×Output current=12 V×13.5 A=162 W.

When the duty cycle of the fan corresponding to the speed of the fan regulated by peak shifting adjustment is less than 50%, the maximum instantaneous power to be provided by the system is:

Output voltage×Output current=12 V×6.5 A=81 W

The starting current of a fan is large and may reach 6.5 A, while the current during the normal working is only 2.6 A. The time when the fan has the large starting current is T1, which is 0.5 s as shown in FIG. 1. The apparatus of the embodiment simultaneously starts two fans, and the simultaneous start of the two fans with a large starting current does not coincide with the peaks of the PWM signals, so that the two electric devices may be started faster each time. The performance of this embodiment is optimum when the duty cycle of the PWM signals does not exceed 50%, and the peaks may be overlapped after the duty cycle of the PWM signals is 50% or higher, as a result, the performance is poor with the increase of the duty cycle.

Figure 5:
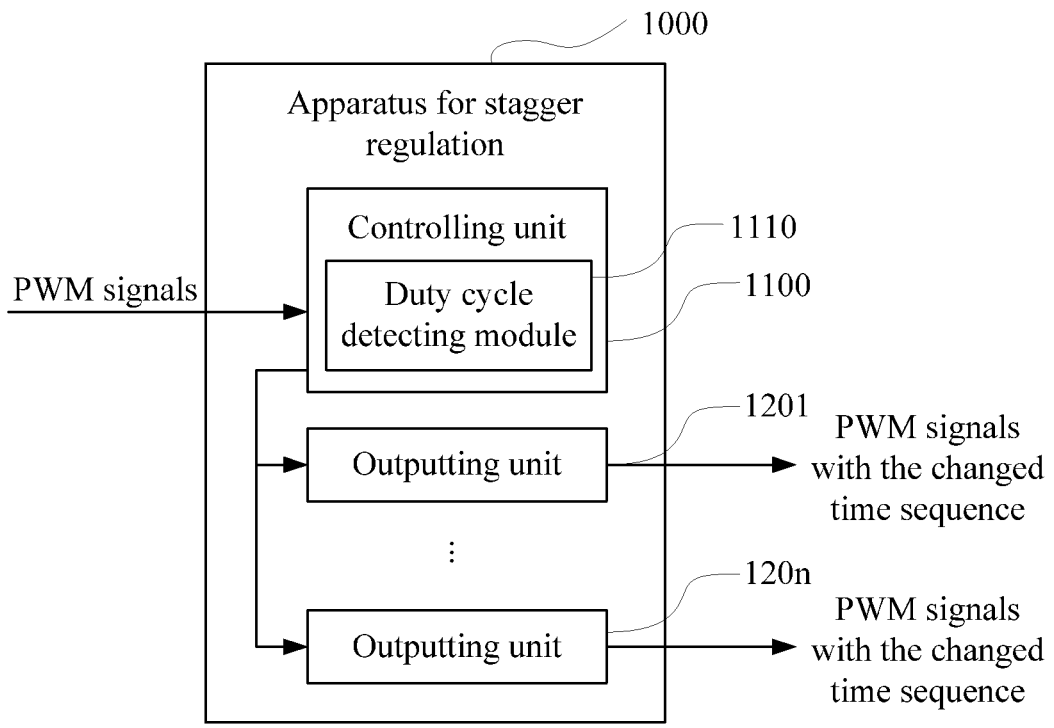
FIG. 5 is a structural diagram of an apparatus for peak shifting adjustment according to another embodiment of the present invention.

Furthermore, as shown in FIG. 5, in another embodiment, the controlling unit 1100 further includes a duty cycle detecting module 1110 that is configured to detect the duty cycle of the PWM signals, and to select a corresponding preset time sequence according to the value of the duty cycle when the duty cycle increases.

When it is detected by the duty cycle detecting module 1110 that the increased duty cycle of the PWM signals is less than or equal to a first threshold, the preset time sequence of the controlling unit includes the following: every time two different outputting units are controlled to output the PWM signals, and one of the two outputting units uses the waveform shifting function. The first threshold value may be 50%. When the duty cycle detecting module 1110 detects that the increased duty cycle of the PWM signals is less than or equal to 50%, the controlling unit 1100 starts to send a control instruction to two outputting units every time, and the control instruction includes controlling one of the two outputting units to use the waveform shifting function. Before receiving the control instruction every time, each outputting unit keeps outputting the PWM signals before the duty cycle increases. For example, the outputting unit may record a duty cycle of 0 before being started, record the duty cycle of the PWM signals with the increased duty cycle after receiving the control instruction every time, and continuously output the PWM signals with the duty cycle until a control instruction is received next time. The detailed example of outputting and receiving a control instruction is disclosed in the embodiment above and is not further described.

When the duty cycle detecting module 1110 detects that the increased duty cycle of the PWM signals is greater than the first threshold, the preset time sequence of the control unit is configured so that one different outputting unit is controlled to output the PWM signals with the increased duty cycle at intervals of T1. Similarly, before receiving the control instruction, each outputting unit keeps outputting the PWM signals before the duty cycle increases. For example, when the duty cycle increases from 0% to 100%, the first outputting unit is first controlled to output the PWM signals with the increased duty cycle, and, at this moment, duty cycles of other outputting units are still 0%. Taking the fan in the embodiment above as an example, the current required by the fan is only 6.5 A. After an interval of T1, the second outputting unit is controlled to output the PWM signals with the increased duty cycle, and, at this moment, the maximum current required by two fans is 6.5+2.6=9.1 A. After another interval of T1, the third outputting unit is controlled to output the PWM signals with the increased duty cycle, and, at this moment, the total current required by three fans is 6.5+2.6× 2=11.7 A. According to such a sequence, when the third outputting unit is controlled to output the PWM signals, the total current required by the fans is 6.5+2.6×2=11.7 A. If the fans are not regulated by a stagger regulating module, the total current required by the three fans is 6.5×3=19.5 A during the start. After the peak shifting adjustment, the maximum current required by the fans is reduced by 7.8 A.

After the start of the $(m-1)^{th}$ fan, and after $(m-1)\times T1$, the m−1 fans all work normally. At this time, the required current is 6.5 A+(m−1)×2.6 A, and, is 6.5 A×m if the system is not regulated by peak shifting adjustment. The current required by the system regulated by peak shifting adjustment is reduced by [6.5 A×m]−[6.5 A+(m−1)×2.6 A]=3.9×(m−1) A, in comparison with the system not regulated by peak shifting adjustment. It may be seen from the equation above that, if there are more fans in the system, the current required by the system regulated by peak shifting adjustment is much lower than the current required by the system not regulated by peak shifting adjustment.

Similarly, after (p−1)×T1, the p−1 fans all work normally. At this time, the required current is 6.5 A+(p−1)×2.6 A, and, is 6.5 A×p if the system is not regulated by peak shifting adjustment. The current required by the system regulated by peak shifting adjustment is reduced by [6.5 A×p]−[6.5 A+(p− 1)×2.6 A]=3.9×(p−1) A, in comparison with the system not regulated by peak shifting adjustment. It may be seen from the equation above that, if there are more fans in the system, the current required by the system regulated by peak shifting adjustment is much lower than the current required by the system not regulated by peak shifting adjustment. This embodiment implements the start of an electric device on a time-sharing basis and takes the starting speed into account through the detection of a duty cycle and the selection of a time sequence, which therefore reaches a better technical effect.

Figure 6:
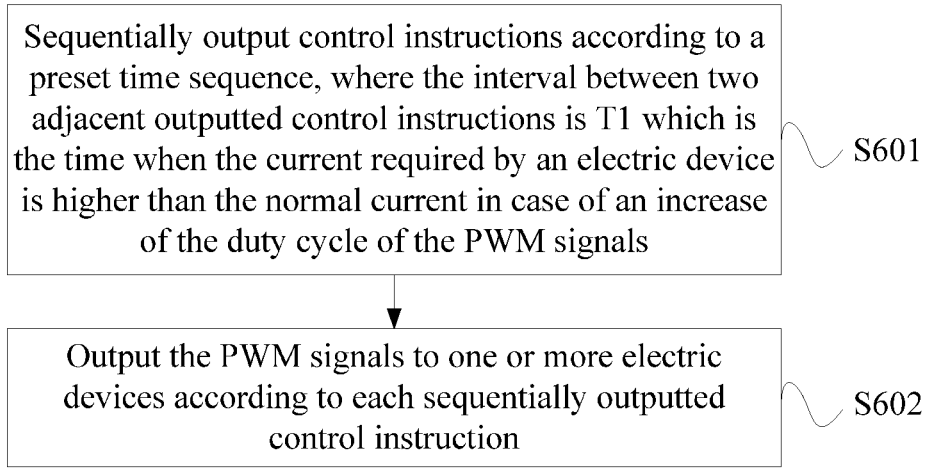
FIG. 6 is a flowchart of a method according to an embodiment of the present invention.

An embodiment of the present invention further provides a method for peak shifting adjustment. As shown in FIG. 6, the method includes steps S601 and S602. In step S601, after receiving PWM signals control instructions are sequentially output according to a preset time sequence. The interval between two adjacent outputted control instructions is T1, which is the time when the current required by an electric device is higher than the normal current in case of an increase of the duty cycle of the PWM signals. (T1 may be set to the time when the current required by the electric device is higher than the normal current in case of an increase of the duty cycle of the PWM signals from 0% to 100%; for example, 0.5 s as shown in FIG. 1). In step S602, the PWM signals are output to one or more electric devices according to each sequentially outputted control instruction.

It should be noted that, once a control instruction is outputted in step S601, the PWM signals are outputted to the corresponding electric devices according to the control instruction in step S602, and then, a next control instruction is outputted (step S602), and the PWM signals are outputted to the corresponding electric devices (step S601).

The method in the embodiment of the present invention reduces the maximum current required by an electric device during the start or speed regulation of the electric device through the peak shifting adjustment of PWM control instructions, without changing the existing characteristics of the electric device.

In the embodiment above, the preset time sequence may be explained as follows. A control instruction is outputted every time to control the PWM signals to be outputted to a corresponding electric device. That is, after the PWM signals are received, the PWM signals are controlled to be outputted to the first electric device. After an interval of T1, the PWM signals are controlled to be outputted to the second electric device, and after another interval of T1, the PWM signals are controlled to be outputted to the third electric device, until the PWM signals are controlled to be outputted to the $n^{th}$ electric device according to such a sequence, so that the interval for outputting the PWM signals to each electric device is T1. That is, the electric device is started by sequentially outputting the PWM signals, and the next electric device is started after the previously started electric device is stable in the current after an interval of T1. In this way, only one electric device requires a current higher than the normal current at one time, which therefore relieves the pressure of the power supply. The electric device may be numbered, for example, 0 to n−1, and the number of each outputting unit multiplied by T1 is the time for outputting the control instruction which controls each electric device.

Furthermore, in the embodiment of the present invention, the preset time sequence may further be explained as follows. A control instruction is outputted every time to control the PWM signals to be outputted to two corresponding electric devices, and to control the PWM signals outputted to one of the electric devices to be shifted by ½ period. Each electric device may be sorted and numbered, for example, 0 to n−1. The algorithm may be implemented as follows: dividing the number of each electric device by 2, taking the integral part Z of the obtained result, multiplying Z by T1 to obtain the time for sending each control instruction, and carrying a waveform shifting instruction in the corresponding control instruction according to the parity of the number. For example, the integers obtained by dividing 0 and 1 by 2 are both Z which is 0, and 0 multiplied by T1 is 0, so the time for sending a control instruction to an electric device 0 and 1 is 0, that is, the control instruction is sent immediately, where 1 is odd, and the control instruction sent to the electric device 1 carries a waveform shifting instruction Likewise, the time for sending a control instruction to the electric devices 2 and 3 is T1, and the control instruction sent to the electric device 3 carries a waveform shifting instruction. With this embodiment, two electric devices may be started simultaneously.

Figure 7:
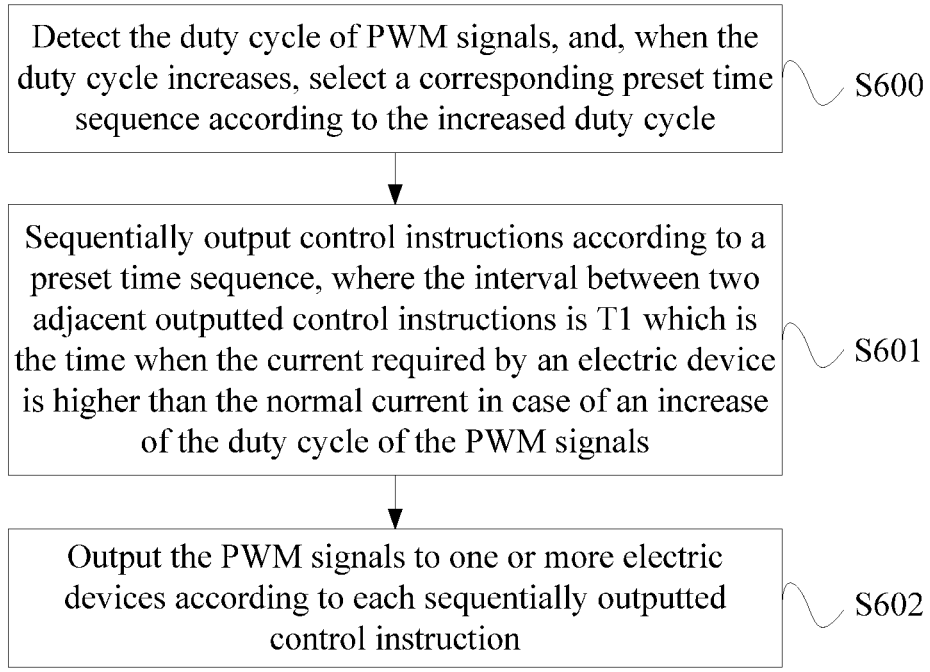
FIG. 7 is a flowchart of a method according to another embodiment of the present invention.

Furthermore, in an embodiment of the present invention, a method for peak shifting adjustment is shown in FIG. 7, and further includes: step S600: detect the duty cycle of PWM signals, and, when the duty cycle increases, select a corresponding preset time sequence according to the increased duty cycle.

When it is detected that the increased duty cycle of the PWM signals is less than or equal to a first threshold, the preset time sequence includes the following: a control instruction is outputted every time to control the PWM signals with the increased duty cycle to be outputted to two corresponding electric devices, and to control the PWM signals outputted to one of the electric devices to be shifted by ½ period. The first threshold value may be 50%. When it is detected that the increased duty cycle of the PWM signals is less than or equal to 50%, a control instruction is sent every time to control the PWM signals with the increased duty cycle to be outputted to two electric devices, and the control instruction sent every time includes: controlling the PWM signals with the increased duty cycle outputted to one of the two electric devices to be shifted. The PWM signals with the increased duty cycle are controlled to be outputted to the corresponding electric devices according to the control instruction above, and, before this, the PWM signals before the duty cycle increases are continuously outputted to the electric devices that are not in relation to the control instruction.

When it is detected that the increased duty cycle of the PWM signals is greater than the first threshold, the preset time sequence above includes the following: a control instruction is outputted every time to control the PWM signals with the increased duty cycle to be outputted to a corresponding electric device. Likewise, the PWM signals before the duty cycle increases are continuously outputted to the electric devices that are not in relation to the control instruction.

This embodiment implements the start of an electric device on a time-sharing basis and takes the starting speed into account through the detection of a duty cycle and the selection of a time sequence, which therefore reaches a better technical effect.

In the embodiments of the present invention, fans are used as examples of electric devices and not intended to limit the present invention. It should be understood that the method and apparatus provided by the embodiments of the present invention may further be applied to other electromechanical products under the control of PWM signals, and to the systems with a large starting current and a small normal working current.

The specific embodiments above describe the objective, technical solutions, and benefits of the present invention in detail. It should be understood that the embodiments above are exemplary only and not intended to limit the scope of the present invention. Any modifications, equivalent replacements, improvements, and the like made without departing from the spirit and principle of the present invention shall fall within the protection scope of the present invention.

What is claimed is:

1. An apparatus for peak shifting adjustment, the apparatus comprising:
    a controlling unit, configured, after receiving Pulse-Width Modulation (PWM) signals, to sequentially control different outputting units to output the PWM signals according to a preset time sequence, wherein an interval between two adjacent outputted PWM signals is T1, which is a time when a current required by an electric device is higher than a normal current in case of an increase of a duty cycle of the PWM signals;
    at least two outputting units each connected to an electric device, each outputting unit configured to output a respective PWM signal to a corresponding electric device according to the control of the controlling unit, wherein each outputting unit is further configured to shift waveforms of the PWM signals by ½ period according to control of the controlling unit, wherein the preset time sequence of the controlling unit is configured to control the as least two different outputting units every time to output the PWM signals and control one of the two outputting units to use a waveform shifting function; and a duty cycle detecting module, configured to detect the duty cycle of the PWM signals, and to select a corresponding preset time sequence according to a value of the duty cycle when the duty cycle increases.

2. The apparatus according to claim 1, wherein the preset time sequence of the controlling unit is configured to control one outputting unit every time to output the PWM signals.

3. The apparatus according to claim 1, wherein, when the duty cycle detecting module detects that the increased duty cycle of the PWM signals is less than or equal to a first threshold, the preset time sequence of the controlling unit includes: controlling two different outputting units every time to output the PWM signals and control one of the two outputting units to use a waveform shifting function; and, when the duty cycle detecting module detects that the increased duty cycle of the PWM signals is greater than the first threshold, the preset time sequence of the controlling unit is configured to control one different outputting unit to output the PWM signals with the increased duty cycle at intervals of T1.

4. The apparatus according to claim 1, wherein the preset time sequence of the controlling unit includes: controlling two different outputting units every time to output the PWM signals and control one of the two outputting units to use a waveform shifting function.

5. The apparatus according to claim 1, wherein the preset time sequence of the controlling unit is configured to control one different outputting unit to output the PWM signals with the increased duty cycle at intervals of T1.

6. A method for peak shifting adjustment, the method comprising:

receiving Pulse-Width Modulation (PWM) signals;

after receiving the PWM signals, sequentially outputting control instructions according to a preset time sequence, wherein an interval between two adjacent outputted control instructions is T1, which is a time when a current required by an electric device is higher than a normal current in case of an increase of a duty cycle of the PWM signals;

outputting the PWM signals to one or more electric devices according to each of the sequentially outputted control instructions, wherein the preset time sequence is configured to output a control instruction every time to control the PWM signals to be outputted to two corresponding electric devices, and to control the PWM signals outputted to one of the electric devices to be shifted by ½ period; and before sequentially outputting the control instructions to output the PWM signals to two electric devices according to the preset time sequence, the method further comprising detecting the duty cycle of the PWM signals, and selecting a corresponding preset time sequence according to a value of the duty cycle when the duty cycle increases.

7. The method according to claim 6, wherein the preset time sequence is configured to output a control instruction every time to control the PWM signals to be outputted to a corresponding electric device.

8. The method according to claim 6, wherein, when it is detected that the increased duty cycle of the PWM signals is less than or equal to a first threshold, the preset time sequence is configured to output a control instruction every time to control the PWM signals with the increased duty cycle to be outputted to two corresponding electric devices, and to control the PWM signals outputted to one of the electric devices to be shifted by ½ period; and, when it is detected that the increased duty cycle of the PWM signals is greater than the first threshold, the preset time sequence is configured to output a control instruction every time to control the PWM signals with the increased duty cycle to be outputted to a corresponding electric device.

9. The method according to claim 6, comprising:
detecting that the increased duty cycle of the PWM signals is less than or equal to a threshold; and
configuring the preset time sequence to output a control instruction every time to control the PWM signals with the increased duty cycle to be outputted to two corresponding electric devices; and
controlling the PWM signals outputted to one of the electric devices to be shifted by ½ period.

10. The method according to claim 6, comprising:
detecting that the increased duty cycle of the PWM signals is greater than a threshold; and
configuring the preset time sequence to output a control instruction every time to control the PWM signals with the increased duty cycle to be outputted to a corresponding electric device.

* * * * *